(12) United States Patent
Pogacar et al.

(10) Patent No.: US 7,203,992 B2
(45) Date of Patent: Apr. 17, 2007

(54) SEPARATOR FOR VACUUM CLEANER (75) Inventors: Janez Pogacar, Trzin (SI); Dorotej Erjavec, Brezovica (SI)

(73) Assignee: Hyla Proizvodnja Razjov In Trgovina D.O.O. (SI)

( * ) Notice: Subject to any disclaimer, the term of this patent is extended or adjusted under 35 U.S.C. 154(b) by 691 days.

(21) Appl. No.: 10/432,743

(22) PCT Filed: Dec. 6, 2000

(86) PCT No.: PCT/SI00/00027

§ 371 (c)(1),
(2), (4) Date: May 27, 2003

(87) PCT Pub. No.: WO01/62133

PCT Pub. Date: Aug. 30, 2001

(65) Prior Publication Data

US 2004/0020004 A1 Feb. 5, 2004

(30) Foreign Application Priority Data

Feb. 22, 2000 (SI) .............................. 200000034

(51) Int. Cl.
*A47L 9/18* (2006.01)
*B01D 47/02* (2006.01)

(52) U.S. Cl. ............................ 15/353; 96/333; 96/359; 95/226; 15/412

(58) Field of Classification Search .................... 5/353, 5/320, 412; 96/359, 333, 353; 95/226; *A47L 9/18*
See application file for complete search history.

(56) References Cited

U.S. PATENT DOCUMENTS 3,902,877 A * 9/1975 Swaim ........................ 55/490
4,382,804 A 5/1983 Mellor
5,902,386 A 5/1999 Gustafson et al.
6,165,365 A * 12/2000 Salyer et al. ............... 210/650

FOREIGN PATENT DOCUMENTS

DE  1 403 126  10/1968

* cited by examiner

*Primary Examiner*—Theresa T. Snider
(74) *Attorney, Agent, or Firm*—Hahn Loeser & Parks LLP; Michael H. Minns (57) ABSTRACT

The separator has a bottom (12), a cylindrical body with turbine blades (15), and a sealing ring (11) at the upper end. The separator is made of segments or of an integral one piece. The segment of the separator (10) is manufactured as a turbine wheel, where the radial supports (17) have a periphery (16), on which periphery (16) are disposed uniformly and approximately radially turbine blades (15) having a slightly inclined outer part in the counter-rotation direction. The sealing ring (11) has radial supports (17) and a ring (19), and at the bottom of the lid (1*a*) it has airflow directing means (20) manufactured as extensions inclined from the periphery towards the radius.

15 Claims, 8 Drawing Sheets

SEPARATOR FOR VACUUM CLEANER

This invention relates to a separator for liquid bath type vacuum cleaners.

Said liquid bath provides the pre-separation and the deposition of the suctioned in particulate matter. The cleaners pertain to the so-called dust control vacuum appliances.

Vacuum cleaners of various designs are known for the use in residential and commercial settings. Their common characteristic is the development of suction resulting in an airflow that draws undesired particulates, and in some embodiments, also liquids into the vacuum apparatus. Subsequently the ingested air has to become separated from the suctioned in particulates and the optional liquids. After the separation of particulates and the optional liquid, the air is exhausted back into the ambient environment. The particulate matter and the optional liquid, however, ought to remain in the vacuum cleaner. The separation of particulates from the air is operable by means of mechanical filters. On the other hand, the separation of particulates, and the optionally entrained liquid, from the air is operable with a liquid bath (filter), and a special separator. The advantages resulting from the separation and the disposal of particulate matter, and optionally the suctioned in liquid, from the air by means of a liquid bath reside therein that the liquid, which is typically water, is always available (mechanical filters are not); that liquids for example cleaning agents, may be drawn in as well as particulates; and that such a vacuum cleaning type appliance provides a slight room humidifying effect during use. A common problem encountered in all mentioned liquid bath type vacuum cleaners is the provision that in addition to particulates also the liquid entrained by the airflow has to be removed from the air. In the majority of liquid bath type vacuum cleaners the separation of the air from the particulate and the entrained liquid is performed by centrifugation owing to the substantially lower specific mass of the air in comparison with the particulate matter or the liquids.

Liquid bath type vacuum cleaners are described for example in U.S. Pat. No. 4,640,697 and DE 36 32 992 respectively, U.S. Pat. Nos. 5,030,257 and 5,125,129. The main drawback of these patented solutions involving the separation of particulates and liquids from the air, however, is the technically exacting and inefficient design of the separators.

According to the publication WO 92/03210 the separation of air from the particulate matter is performed in three stages. During the passage of the airflow through the liquid trap the larger particles become wetted and are trapped therein. Smaller particulates are drawn by the airflow in the direction of the separator, and coalescence with microscopic liquid droplets on its surface. Owing to the high-speed rotation of the separator (from 20,000 to 25,000 rpm) they are forcibly expelled back into the liquid container. The smallest particles and the liquid micro-droplets are entrapped inside the separator impinging the inner wall of the separator, owing to the magnitude of the centrifugal acceleration, which is up to 12,000 Gs. This third and last stage of the separation of the air from particulates and the liquid leads to the accumulation of particulates inside the separator. These particulates clog the slots in the separator, thus impairing the efficiency of the separator as well as the complete vacuum cleaner. The separator becomes unbalanced and suffers vibrations. The mentioned accumulation of particulates in the interior of the separator requires periodical cleaning of the separator. This is inconvenient and potentially risky for the user, because it involves the dismounting of the separator. During this task the operation of the motor should be forbidden, because the rotation would injure the user. Consequently, this solution for the separation of the air from particulates and the liquid is problematic, especially with regard to the safety of the user as well as the operability.

The separation in conformance with U.S. Pat. No. 5,902,386 is solved in an analogous manner as in the above-referenced publication WO 92/03210. The improvement resides in the slot depth to width ratio of the separator, and a labyrinth arranged over the separator, which develops a counter-airflow and impedes the entering of droplets and dust particulates into the interior zone of the suction turbine.

The basic and common drawback of the separators disclosed in WO 92/03210 and U.S. Pat. No. 5,902,386 is the design of the separator in the form of a conical basket having vertical slots in the sidewall of the separator. The sidewall is formed of a plurality of ribs, which are separated by slots. Owing to the high rotation speed of the separator and the resulting augmented centrifugal forces, the ribs and consequently the sidewall become convexly deformed. By the deformation of the separator the apertures of the slots are increased, and the separator becomes inefficient. The separator also becomes unbalanced and suffers from vibrations. The only possible way to avoid deformations of a separator designed in the above manner is the reinforcement of the ribs of the sidewall, thus diminishing the apertures of the slots. The sidewall becomes reinforced, the slots, however, become smaller. The decrease in the slot width to rib width ratio results in decreased permeability and impaired efficiency of the separator. Wider ribs mean also an increased area for the deposition of dust particles and other pollutants (dirt particles). Separators of this type are less efficient owing to their design, and become even less efficient because of the accumulation of dust particles and other pollutants. Periodical cleaning is required, as already discussed.

An interesting solution based on a completely different three-stage separation is described in U.S. Pat. No. 5,908,493.

One object of this invention is the design of a vacuum cleaner assembly with a separator ensuring a highly efficient separation. of particulates and the entrained liquid from the airflow, and preventing the deposition of dust particles and other pollutants on the separator. The separator is not deformable and is completely safe. This means that the user is not compelled to clean or otherwise service any of the rotating parts. Consequently, the separator is inaccessible for the user.

Another object of this invention is a simple and reliable prevention of the entrance of liquid droplets, dust particles and other pollutants into the turbine zone.

The above objects are provided in accordance with the independent patent claim of the present invention.

This invention will be described in detail by the following working example, and the following drawings, wherein.

Figure 1:
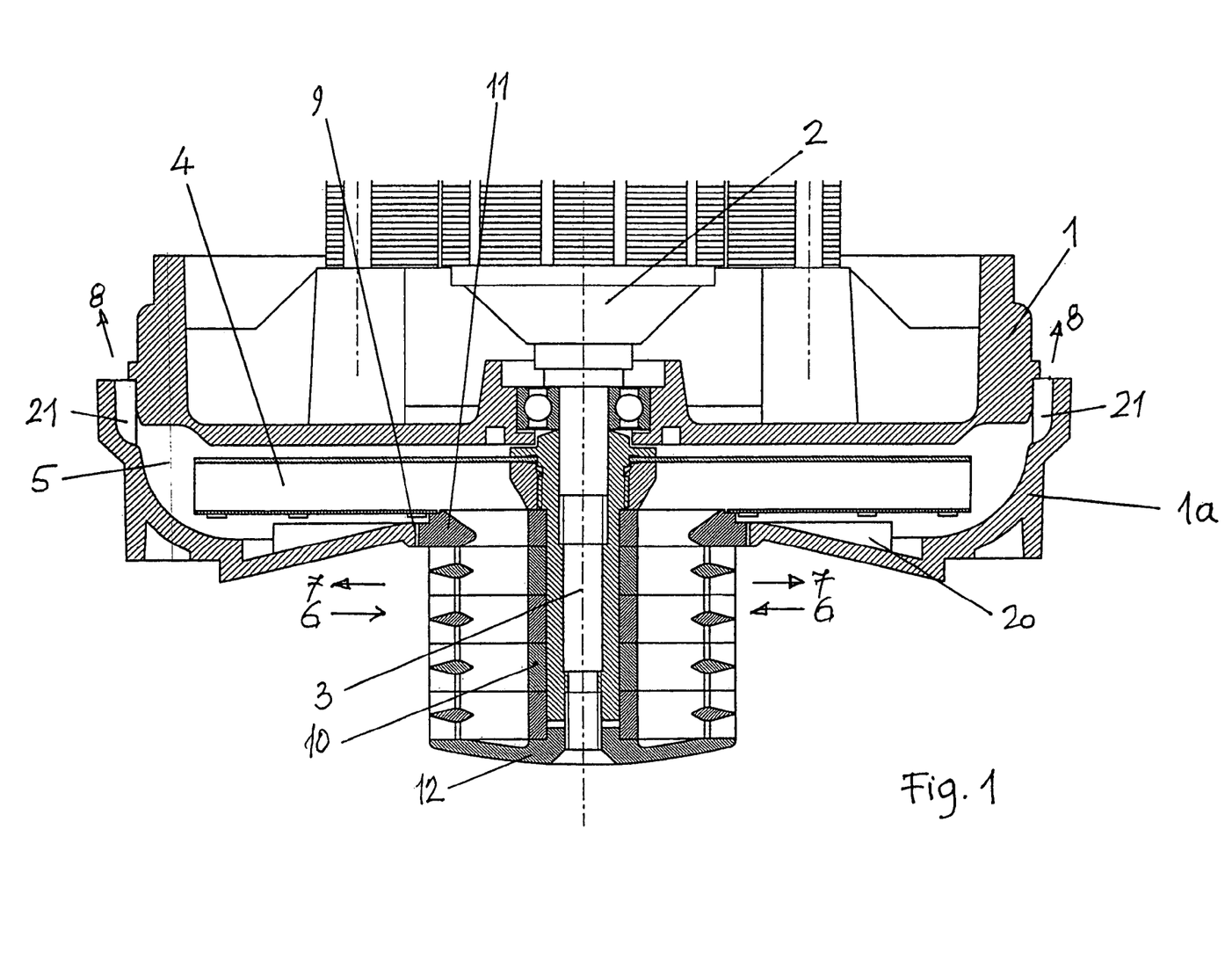
FIG. 1 is an embodiment of an assembly comprising a separator, a sealing ring and a turbine.

The liquid bath type vacuum cleaner operates by means of an assembly consisting of the separator 10, the sealing ring 11, and the turbine with the motor 2 in the housing 1. In principle the vacuum cleaner operates by the driving of the turbine 4, the sealing ring 11, and the separator 10 on the shaft 3 by the motor 2. The assembly and the operation are represented on FIG. 1. The turbine 4 generates a flow, which is directed as a mixture 6 consisting of air, water droplets and other pollutants, into the separator 10. Owing to the high-speed rotation of the separator 10 the droplets and other pollutants of a high specific mass are substantially prevented to enter the interior of the separator 10. The air having a low specific mass is caused by the vacuum generated by the turbine 4, to enter the separator 10, where it is suctioned in by the turbine 4, and then expelled into the environment as shown by the arrow 8. The droplets and other pollutants randomly entering the separator 10, are subjected to rotation in the separator 10, and then expelled from the separator 10 by centrifugation as shown by the arrow 7. It is important, that the separator 10 and the zone 5 of the turbine 4 are joined in a manner impeding the flow of air, droplets and pollutants through the slot 9 into the zone 5 of the turbine 4. Gaskets and similar seals are not suitable because of friction and wear. According to this invention are foreseen airflow directing means 20 at the bottom of the lid 1a. Said means generate by air rotation a pressure, which is in balance with the turbine pressure in the zone 5. On the inner circumference the lid 1a has extensions 21 enabling a stable and central securing of the lid 1a to the housing 1, as shall be discussed in detail with respect to FIG. 9.

Figure 2:
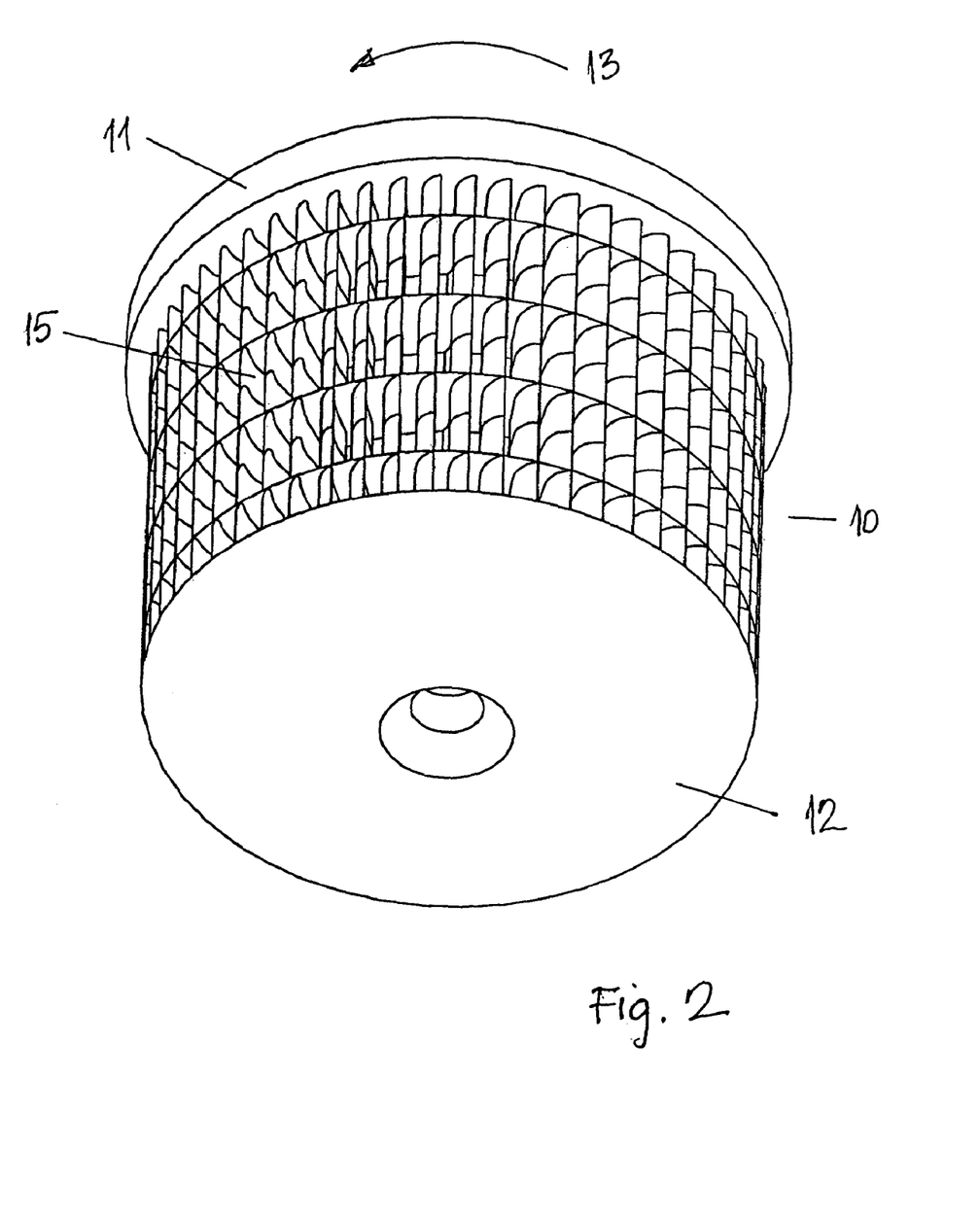
FIG. 2 is an embodiment of the separator and the sealing ring.
Figure 3:
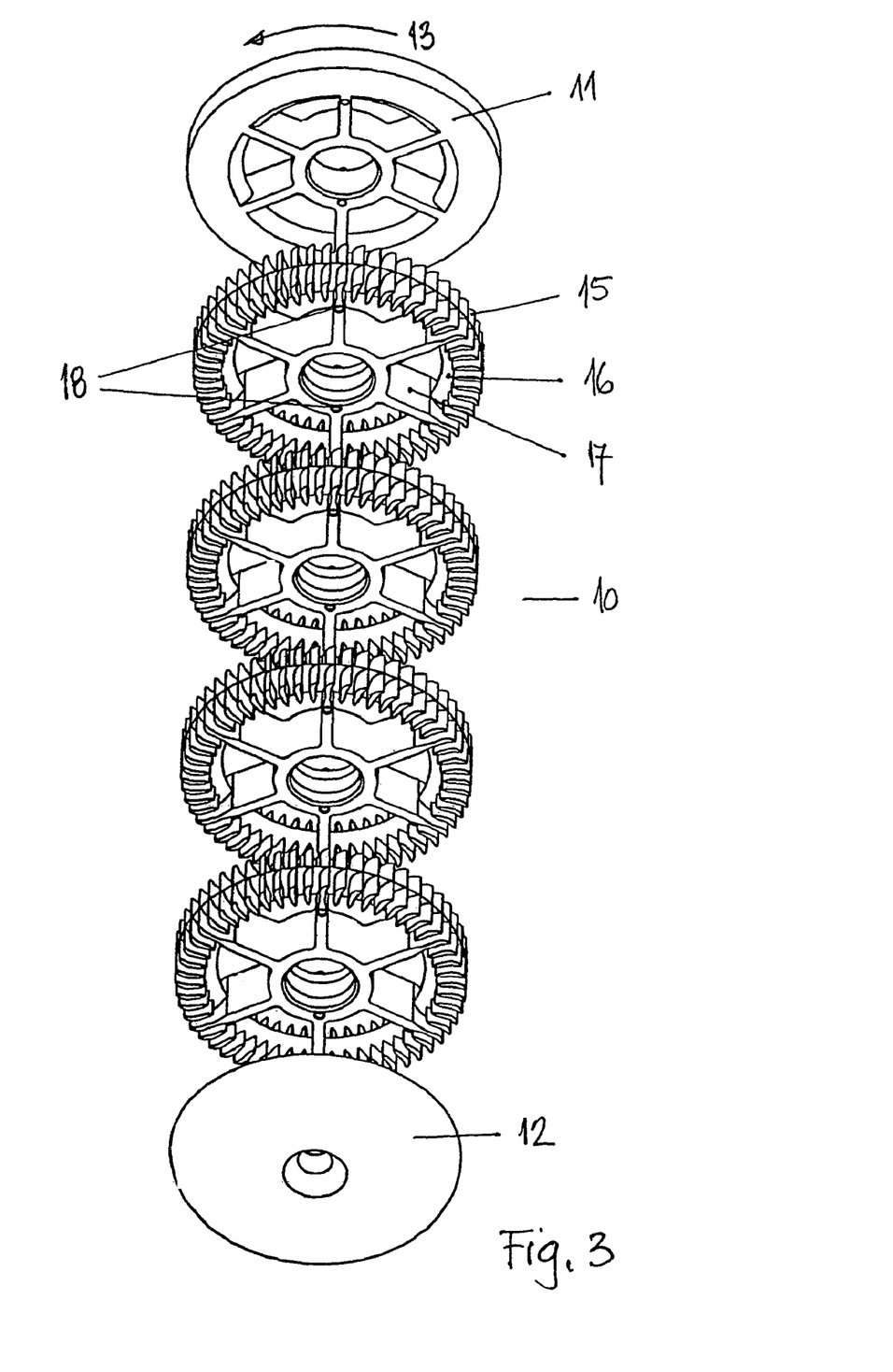
FIG. 3 is an exploded perspective view of the separator and the sealing ring.

The design and the operation of the separator are illustrated with the aid of FIGS. 2 and 3, as well as 4, 5 and 6.

In conformance with FIG. 2 is the separator 10 provided with a bottom 12, a cylindrical body having turbine blades 15, and a sealing ring 11 at the upper end with respect to the direction of the turbine 4. The assembly comprising the separator 10 and the sealing ring 11 is secured to the shaft of the motor 2. The direction of the rotation is shown by the arrow 13.

In conformance with FIG. 3, which is an equivalent of the FIG. 2, yet in exploded view, is the separator 10 provided with a bottom 2 closing the separator 10, and enabling the securing of the assembly comprising separator 10 and the sealing ring 11, on the shaft 3 of the motor 2. In this embodiment the separator 10 consists of four superposed segments that are positioned by means of positioning joints 18. In this embodiment, the positional joints 18 are provided by hollows at the lower part of the segment of the separator 10 and projections at the upper part of the segment, and correspondingly on the sealing ring 11 and the lid 1a as well.

Figure 4:
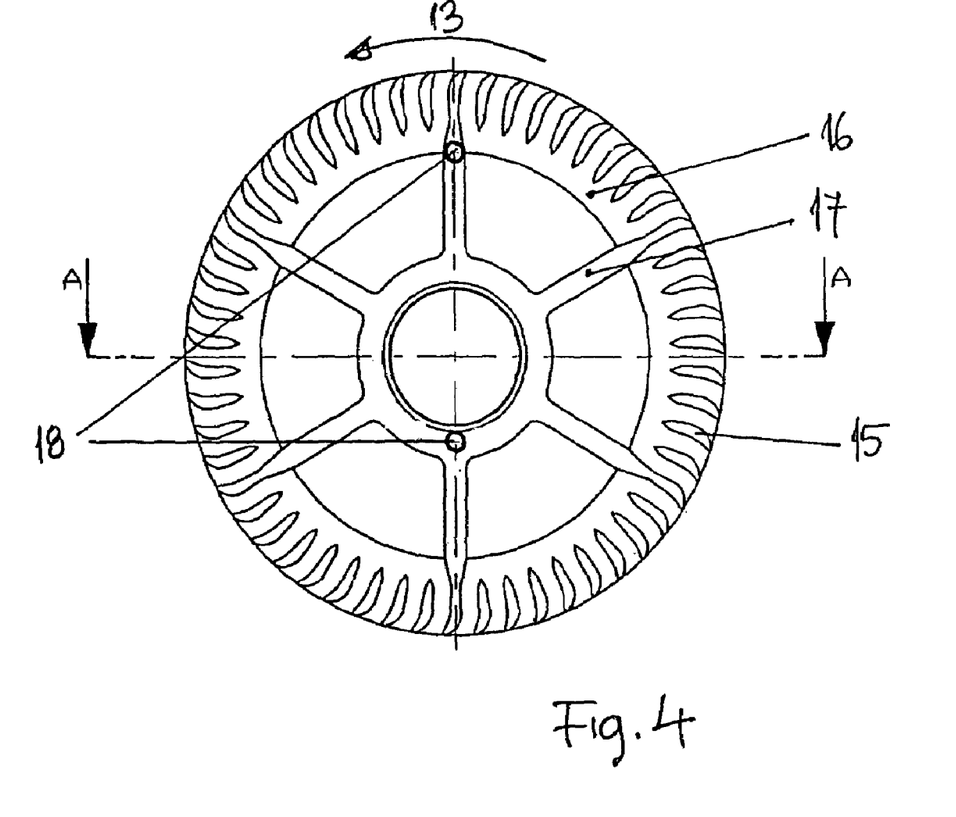
FIG. 4 is a fragmentary elevational view of the separator.
Figure 5:
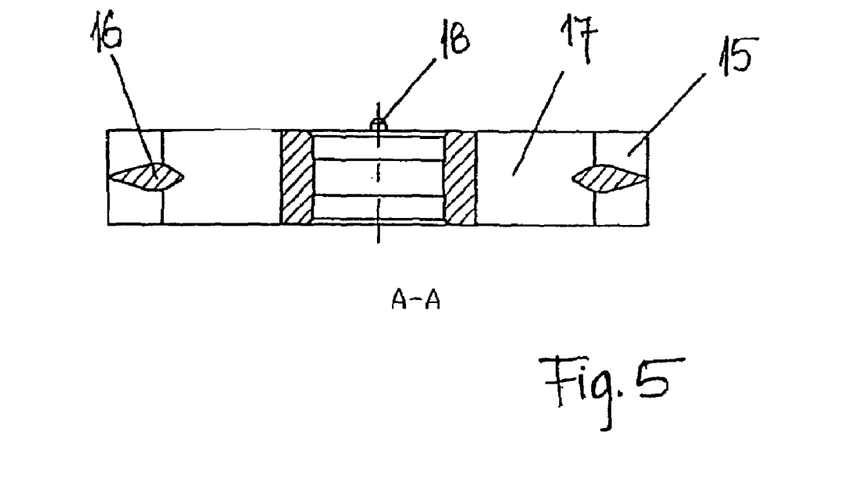
FIG. 5 is a fragmentary cross sectional view of the separator.

In conformance with FIGS. 4 and 5 the segment of the separator 10 is manufactured as a turbine wheel having a periphery 16 on radial supports 17. On the periphery 16 are distributed turbine blades 15 uniformly and approximately radially, with a slight inclination of the outer part in counter-rotation direction. The direction of rotation is shown by the arrow 13. The rotation of the separator 10 and the resulting vacuum generated by the turbine 4 cause the radial entering of the air into the interior. The majority of the droplets, dust and other pollutants are expelled because of their large specific mass. The droplets, dust and other pollutants that are randomly entering the interior of the separator 10 are rotated additionally by the radial supports 17, and are between the blades 15 expelled from the separator 10. The blades 15 and the periphery 16 have an aerodynamic profile ending at an edge, which is similar to the edge of an aircraft wing. Thus, the airflow is improved and the deposition of pollutants is impeded. Hitherto known designs show in comparison with this invention large faces with respect to the radial direction resulting in a disadvantageous deposition of pollutants and an impaired airflow. The construction in conformance with this invention is also endowed with mechanical strength, since the periphery 16 is suspended at several sites on the radial supports 17, and the blades 15 are suspended on the periphery 16. The separator 10 is accordingly not subjected to deformation due to centrifugal force. In this embodiment the separator consists of segments enabling the use of simple extrusion tools. The variation of the number of segments enables optional heights and the resulting efficiency of the separator 10. It is understood that this invention encompasses also a separator made of an integral one piece, optionally including the sealing ring 11 and the bottom 12.

Figure 6:
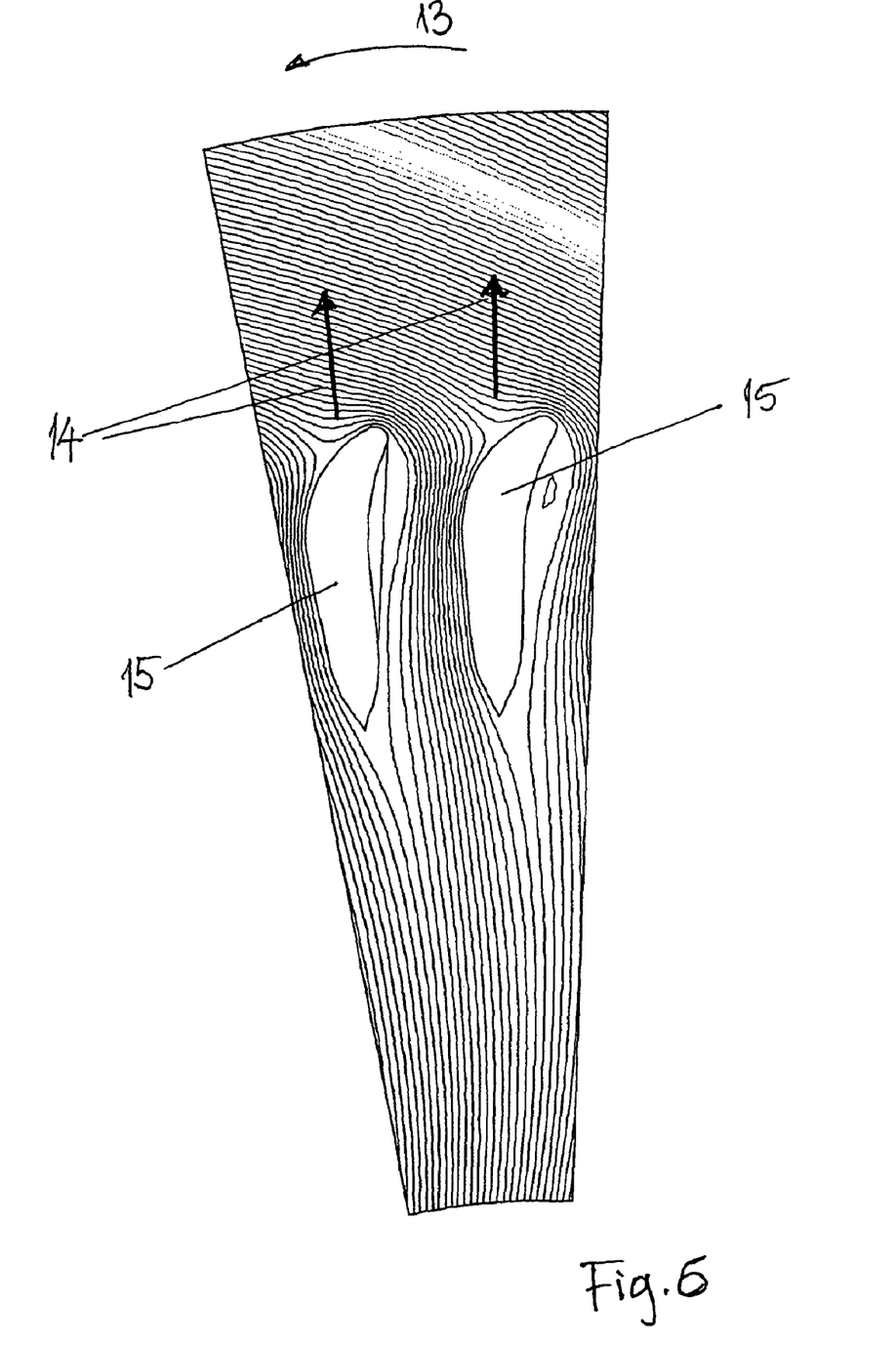
FIG. 6 is a cross sectional view of the turbine blades in air streamlines.

FIG. 6 represents two blades in cross-section, with a computer simulation of air streamlines. Owing to the rotation of the blades 15 in the direction 13 and the resulting vacuum the air enters between the blades 15 and becomes pressurized. The pollutants, however, are rejected approximately in the direction 14.

Figure 7A:
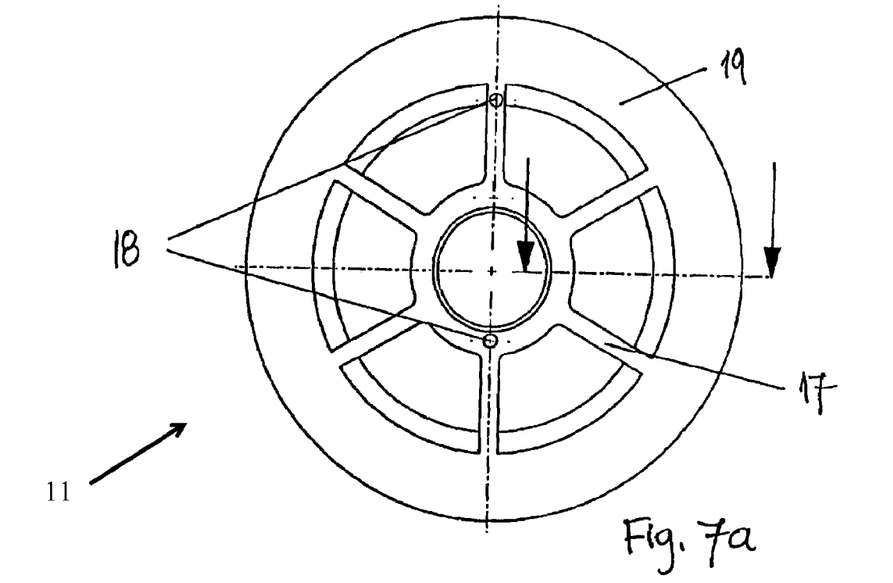
FIG. 7a is an elevational view of the sealing ring.
Figure 7B:
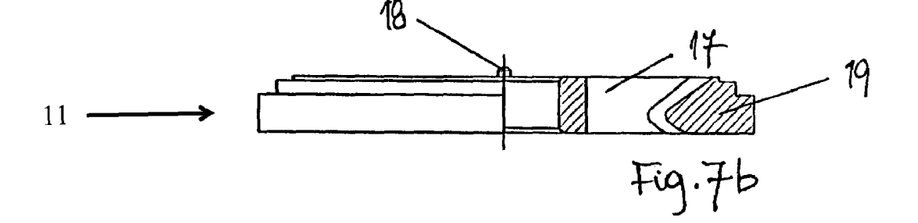
FIG. 7b is a side view partially in cross section of the sealing ring.
Figure 7C:
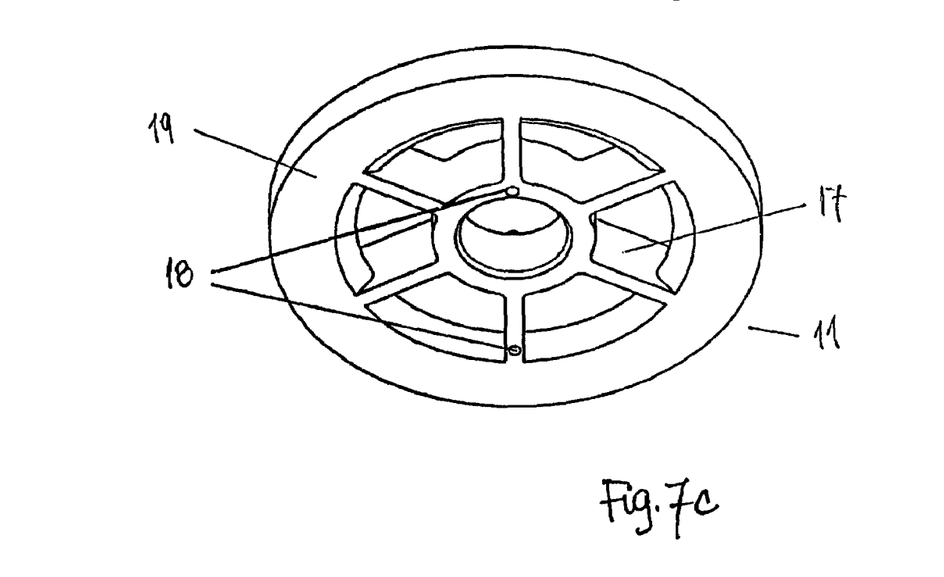
FIG. 7c is a perspective view of the sealing ring.

In conformance with FIGS. 7a, 7b and 7c the sealing ring 11 is manufactured in a similar manner as the segment of the separator 10. The sealing ring 11 is like the segment of the separator provided with radial supports 17, positional joints 18 and a ring 19. The upper periphery of the ring 19 has a stepped form, in order to minimize the slot 9 between the lid 1a and the ring 19, and between the turbine 4 (the turbine 4 being shown in FIG. 1) and the ring 19, as evident also from FIG. 1.

Figure 9:
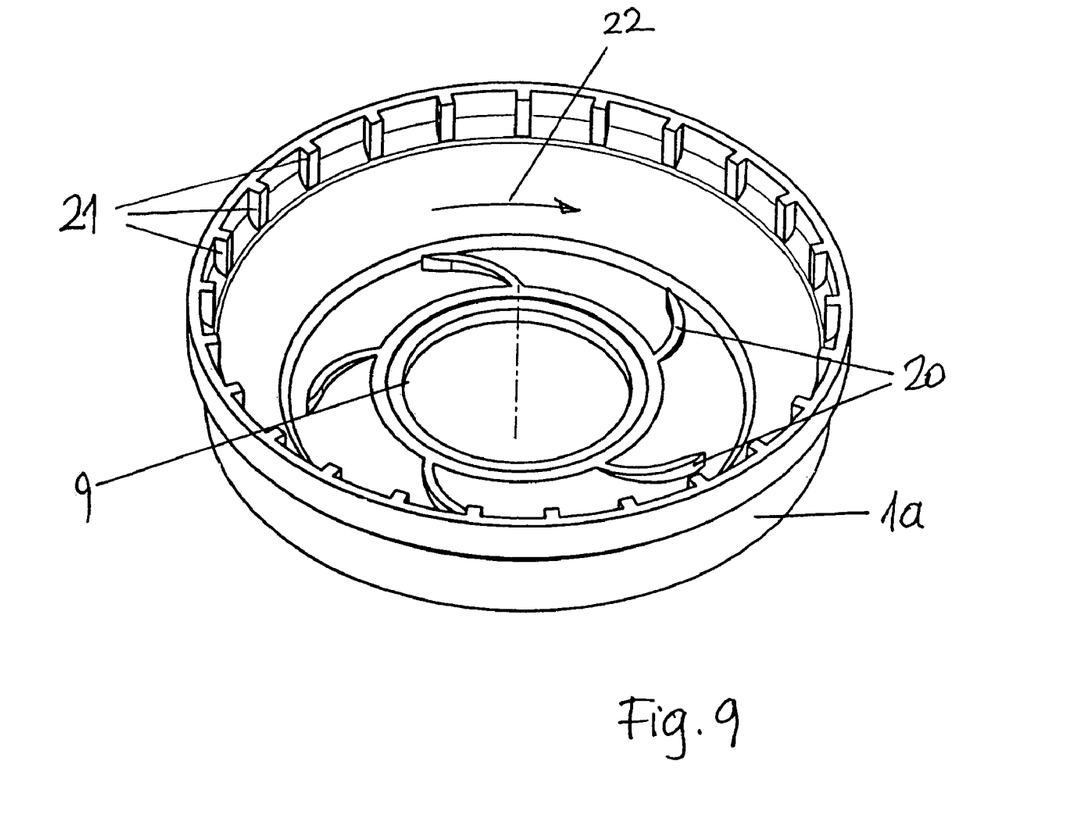
FIG. 9 is the lid over the turbine zone.

In conformance with FIG. 9 and with respect to the direction 22 of the rotation of the turbine 4 the air also is rotating under the turbine 4 in the direction 22. At the bottom of the lid 1a are provided airflow directing means 20 in the form of extensions inclined from the periphery towards the radius. Since the air under the turbine 4 is in rotation, it is directed by the means 20 towards the radius, namely towards the slot 9. Consequently, an overpressure develops over the slot 9. In the slot 9 the pressures become balanced, and no airflow is generated. The extensions 21 on the inner circumference of the lid 1a enable a stable and centric securing of the lid 1a on the housing 1, and simultaneously enable the exhaust of the air into the environment as shown by the arrow 8 on FIG. 1.

The embodiment in conformance with FIG. 9 represents five airflow directing means 20. It is understood, that within the scope of this invention the number of airflow directing means 20 is optional, yet >.

Figure 8A:
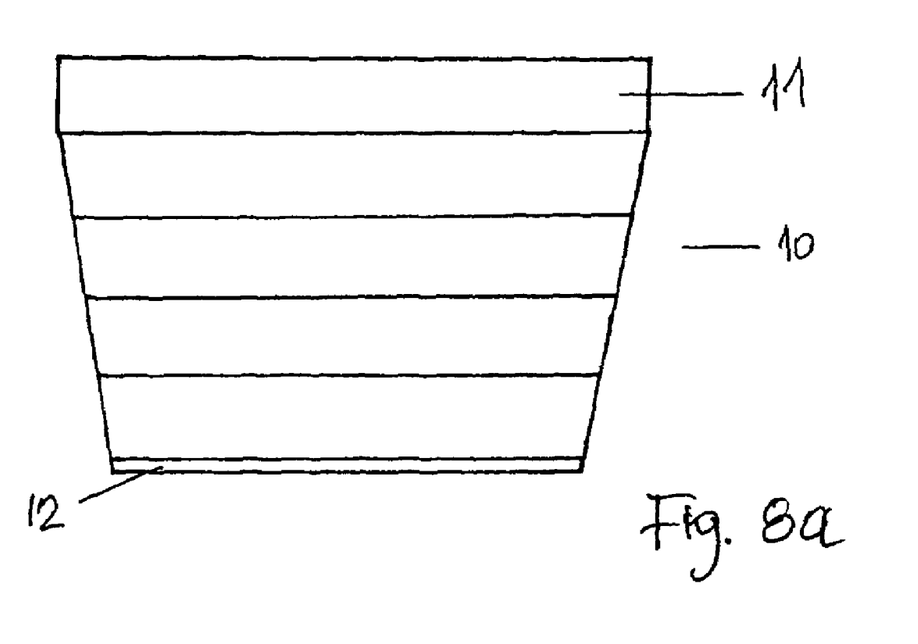
FIG. 8a is a conical embodiment of the separator.
Figure 8B:
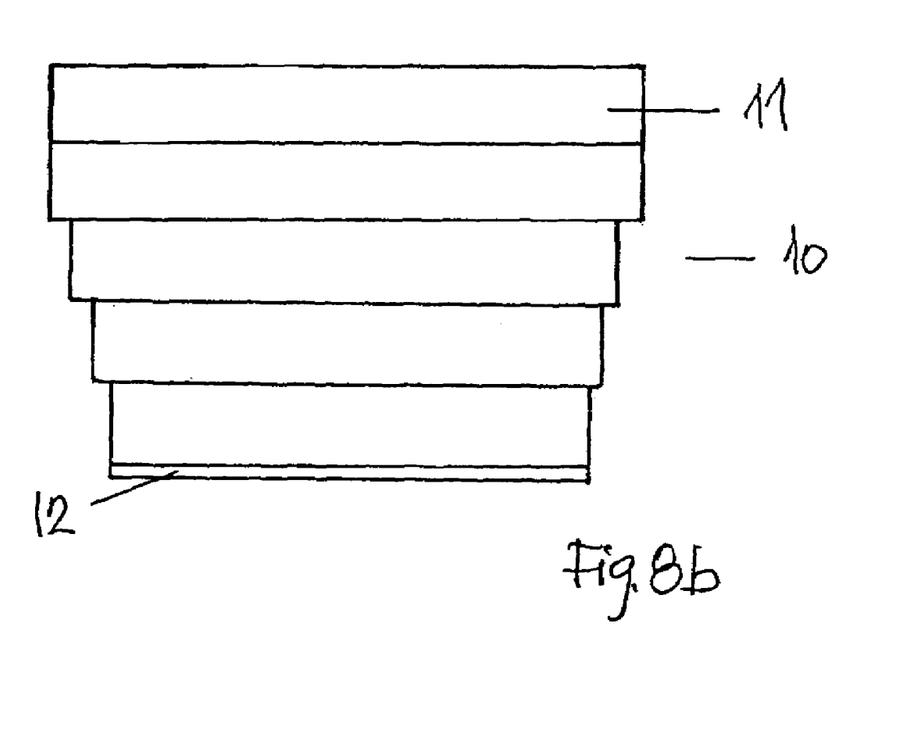
FIG. 8b is a stepped conical embodiment of the separator.

The FIGS. 8a and 8b represent conical embodiments of the separator 10. Consequently, this invention includes also a separator 10, which is not cylindrical as described in the working example, but conical, which means that the radius of the separator 10 decreases in the direction towards the lid 1a.

This invention is described in the working examples. It is understood, that this invention encompasses all designs, wherein the separator has radial supports 17 and aerodynamic turbine blades 15 on the periphery 16, irrespective of the fact that the separator consists of separate segments, a sealing ring 11 and a bottom 12, or of an integral one piece or of any other combination. Within the scope of this invention are also all designs, wherein the sealing is provided by a sealing ring 11 in the slot 9, and airflow directing means 20 at the bottom of the lid 1*a*.

The invention claimed is:

1. An apparatus for seperating air from particulate matter and liquids in a liquid bath type vacuum cleaner, said apparatus comprising:
   a motor shaft;
   a turbine for creating airflow, said turbine operably connected to said motor shaft;
   a separator operably connected to said motor shaft,
   said separator having a bottom end and an upper end, wherein said upper end is situated proximate to said turbine;
   said separator comprises a plurality of segments that are vertically spaced from one another, each segment comprising a body having blades on a periphery thereof;
   a sealing ring positioned at said upper end of said separator; and
   a lid for housing said turbine, said lid comprising means for directing airflow away from said separator.

2. The apparatus as recited in claim 1, wherein said plurality of segments include positioning joints comprised of openings at a lower part of a segment and corresponding projections at an upper end of another segment.

3. The apparatus as recited in claim 1, wherein each segment of said separator is configured as a wheel.

4. The apparatus as recited in claim 3, wherein each segment comprises an outer periphery supported by a plurality of radial supports.

5. The apparatus as recited in claim 3, wherein said blades are inclined in a direction opposite a direction in which said turbine rotates.

6. The apparatus as recited in claim 1, wherein said separator is cylindrical.

7. The apparatus as recited in claim 1, wherein said separator is conical.

8. The apparatus as recited in claim 1, wherein said separator is stepped conical.

9. The apparatus as recited in claim 1, wherein said blades have a profile resembling an aircraft wing.

10. The apparatus as recited in claim 1, wherein said sealing ring includes radial supports.

11. The apparatus as recited in claim 1, wherein said means for directing airflow is configured as an extension inclined from a periphery of said lid towards a radius of said lid.

12. A separator for liquid bath type vacuum cleaners comprising:
    a means for generating airflow;
    a centrifugal separator;
    said centrifugal separator comprising a plurality of segments that are vertically spaced from one another, each segment comprising a body having a plurality of turbine blades on a periphery thereof;
    a sealing ring at a top portion of said centrifugal separator;
    means for directing air upwards away from said centrifugal separator.

13. A apparatus capable of separating air from particulate matter and liquids comprising:
    a housing,
    a motor positioned within said housing,
    a shaft connected to said motor and extending out of said housing;
    a turbine connected to said shaft;
    a turbine housing;
    a separator assembly comprising,
    a plurality of segments that are vertically spaced from one another, each segment comprising a separator body positioned on said shaft,
    a sealing ring secured to a top part of said separator assembly; and
    means for directing airflow positioned on a bottom portion of said turbine housing.

14. The apparatus as recited in claim 13, wherein said separator body includes a plurality of blades on a periphery thereof.

15. The apparatus as recited in claim 13, wherein said separator assembly is a shape selected from the group consisting of cylindrical, conical and stepped conical.

* * * * *